United States Patent
Eschenbach

Patent Number: 6,017,295
Date of Patent: Jan. 25, 2000

[54] RECUMBENT MOBILE EXERCISE APPARATUS

[76] Inventor: Paul William Eschenbach, 143 Lakeland Ave., Moore, S.C. 29369

[21] Appl. No.: 09/063,316

[22] Filed: Apr. 20, 1998

Related U.S. Application Data

[63] Continuation-in-part of application No. 08/801,194, Feb. 18, 1997.

[51] Int. Cl.[7] .............................. A63B 22/00; B62K 21/18
[52] U.S. Cl. .............................. 482/57; 482/51; 280/257
[58] Field of Search .............................. 482/51, 52, 53, 482/57, 70, 63, 62; 280/234, 257, 246, 252, 260; 74/594.1, 594.3

[56] References Cited

U.S. PATENT DOCUMENTS

| | | | |
|---|---|---|---|
| 5,527,246 | 6/1996 | Rodgers | 482/57 |
| 5,591,107 | 1/1997 | Rodgers | 482/57 |
| 5,611,757 | 3/1997 | Rodgers | 482/51 |
| 5,690,346 | 11/1997 | Keskitalo | 482/57 |
| 5,836,855 | 11/1988 | Eschenbach | 482/51 |

*Primary Examiner*—Stephen R. Crow

[57] ABSTRACT

A mobile exercise apparatus is provided for sit down exercise operated in the recumbent position where foot operated pedals follow an oblong pedal path coordinated with arm exercise. The pedal path is configured to provide a long downward power stroke that remains generally tangent to the lower leg for greater leg exercise and torque conversion to the driven wheel. The pedals are guided by extended foot supports as part of a linkage system that is coupled to the arm exercise. Pedal motion and arm exercise can be adjusted during operation of the exercise apparatus to exercise different muscles.

22 Claims, 6 Drawing Sheets

RECUMBENT MOBILE EXERCISE APPARATUS

RELATED APPLICATION

This is a continuation-in-part of application Ser. No. 08/801,194 filed Feb. 18, 1997.

BACKGROUND OF THE INVENTION

1. Field

The present invention relates to a sit down mobile exercise apparatus operated in a recumbent position where foot operated pedals follow an oblong pedal path. More particularly, the present invention relates to an exercise machine having separately supported pedals for the feet and arm exercise coordinated with motion of the feet to drive at least one wheel of a mobile exercise apparatus.

2. State of the Art the benefits of regular exercise to improve overall health, appearance and longevity are well documented in the literature. For exercise enthusiasts, the search continues for safe apparatus that provides full body exercise for maximum benefit in minimum time. Furthermore, the aging population tends to favor recumbent forms of exercise that encourage muscle tone in an outdoor setting.

The sit down exercise cycle is the most commonly used apparatus today to elevate the heart rate and exercise some of the leg muscles. To achieve any significant benefit, however, an extensive amount of time is demanded of the user resulting in boredom. To reduce the time needed to elevate the heart rate and exercise additional muscles, various forms of hand cranks and arm levers have been added to sit-down stationary and mobile exercise cycles.

Numerous combinations of levers and cranks to combine exercise for arms and feet can be found. Tong in U.S. Pat. No. 5,511,810 adds arm levers coupled to the crank of a bicycle for hand driving coordinated with the foot pedals. Jeranson in U.S. Pat. No. 5,431,614 adds rocking handlebars to a bicycle which drives the front wheel. Hex in U.S. Pat. No. 4,645,200 combines arm and foot levers for sit down exercise while Glaser in U.S. Pat. No. 3,727,913 shows reciprocating handle and seat coupled to a foot crank. Yount et al. in U.S. Pat. No. 3,759,512 shows spring loaded arm levers and foot crank while Mester in U.S. Pat. No. 3,966,201 provides independent levers with a foot crank for various sit down exercise. Hooper in U.S. Pat. No. 4,188,030 couples a pair of swing arms to a foot crank with a crank eccentric for sit down exercise having air resistance.

Lucas et al. in U.S. Pat. No. 4,880,225 offer oscillating arm levers coupled to the foot crank by a connecting rod. Dalebout et al. in U.S. Pat. Nos. 4,971,316 and 5,000,4444 also shows oscillating swing arms coupled to the foot crank by an offset second crank and connecting rod. Lom in U.S. Pat. No. 4,986,533 offers oscillating arms driven by a slider-crank mechanism coupled to a foot crank.

In recent years, recumbent cycles with or without arm exercise have become popular where the seat of the operator is generally the same height from the floor as the crank axis. Actually, recumbent cycles started appearing over 35 years ago with Aronsohn in U.S. Pat. No. 3,017,180 having simple cranks for both feet and arms. Comfort was addressed by Baldwin in U.S. Pat. No. 4,589,656 adding a plush seat and crank driven air aimed at the operator. Lo in U.S. Pat. No. 4,953,850 added wind drag belt driven by a simple crank and handle bars adjacent to the seat.

Several recumbent mobile cycles offer lower body exercise with simple foot crank propulsion having various steering mechanism such as Harmeyer in U.S. Pat. No. 5,263,732 and Rosengrant et al. In U.S. Pat. No. 5,059,469. James in U.S. Pat. No. 5,700,228 offers a mobile gyrocycle combining a simple foot crank with rotatable handles for upper and lower body exercise. Liu in U.S. Pat. No. 5,601,301 shows combinations of arm, foot and torso oscillations along with a simple foot crank option to muscle power vehicles. Liebert in U.S. Pat. No. 5,383,675 uses arm and leg muscles extending and retracting to propel various human powered vehicles steered by head movement.

Roberts in U.S. Pat. Nos. 5,178,593 and 5,269,736 combines simple crank recumbent exercise and upper body exercise where the operator moves to a prone posture for arm exercise. Pitzen et al. in U.S. Pat. No. 5,114,391 provides a recumbent with independent swing arms and foot pedals each driving an electrical generator. Habing et al. in U.S. Pat. No. 5,580,337 adds seat adjustment during exercise. Bostic et al. in U.S. Pat. No. Des. 353,422 display state of the art swing arm handle and simple crank foot pedal exercise. There remains a need for recumbent exercise that provides more challenging total body coordinated exercise.

Swing arms that support a foot pedal to gain mechanical advantage over a simple crank were first used in velocipedes over 100 years ago as in the home trainer by McClintock in U.S. Pat. No. 359,800. Golding in U.S. Pat. No. 400,204 showed several foot pedal arm curves that were vertically extended to increase the power stroke of a velocipede. Montiglio in U.S. Pat. No. 1,577,585 shows swing arms attached to a crank and horizontal slider to vertically extend the foot stroke of a simple bicycle crank to improve the power stroke. Marc in U.S. Pat. No. 4,193,324 offers a vertical oriented elliptical pedal path using a hypocycloidal gear crank drive again to improve the power stroke of a bicycle.

Yamaguci in U.S. Pat. No. 4,560,182 also vertically extends the pedal curve of a bicycle using a pedal swing arm attached to a gear pair with a crank and slider joint to gain mechanical advantage for the power stroke. Schirrmacher in U.S. Pat. No. 4,561,318 uses a pair of long swing arms to extend the vertical height of the pedal path to power a bicycle. Bortolin in U.S. Pat. No. 4,456,276 brings a modern version of the velocipede from Australia with several pedal swing arm versions having an extended vertical pedal path to improve the power stroke of a bicycle. Broluska in U.S. Pat. No. 2,166,565 devised a linkage crank system that changes a simple crank pedal path to address the deal center problem common with bicycle cranks. A vertically extended foot pedal path is shown by Hwang in U.S. Pat. No. 4,842,269 for sit down cycle exercise where a gear crank climbs a vertically extended gear track.

Pedal swing arms having a simple pivot have been adapted to exercise machines such as Hartmann in U.S. Pat. No. 4,555,109 where a dependent mechanism is used for up and down control in place of a simple crank. Leg only exercise in the recumbent position is shown in Webb in U.S. Pat. No. 5,106,081 where a four-bar linkage double rocker mechanism guides a foot pedal with reciprocating motion. Prince et al. in U.S. Pat. Nos. 5,514,053 and 5,437,587, and Hawkins et al in U.S. Pat. No. 5,514,053 provide horizontal linear foot pedal motion. Habing in U.S. Pat. No. 5,445,583 provides swing arm foot pedals coordinated with seat back movement. Hsieh in U.S. Pat. No. 5,518,482 offers multi-function recumbent exercise with a dual set of swing arms for leg exercise.

Hix in U.S. Pat. Nos. 4,645,200 and 4,949,954 uses simple foot pedal swing arms for sit down exercise having swing arm handles where the swing arms are coupled by belt means. Recumbent arm and foot swing levers are coordinated or independent in McBride et al in U.S. Pat. No. 5,505,679. Hildebrandt et al. in U.S. Pat. No. 5,356,356 shows arm and foot levers that are connected to each other for contralateral movement. Sleamaker in U.S. Pat. No. 5,354,251 provides a multifunction unit having foot swing arms and cable arm exercise.

There is a need for a mobile recumbent cycle that has an oblong inclined pedal path configured to better utilize the range of leg and foot motion possible with recumbent exercise for enhanced leg exercise than is possible with a simple bicycle crank. There is a further need for extended closed loop hand path arm exercise that can be coordinated with extended foot pedal path exercise for total body mobile exercise.

SUMMARY OF THE INVENTION

The present invention relates to the kinematic motion control of pedals which provide extended leg exercise for mobile recumbent exercise. More particularly, apparatus is provided that offers variable intensity exercise through leg operated cyclic motion in which the pedal supporting each foot is guided through successive positions during the motion cycle to drive at least one wheel of a mobile exercise apparatus. Linkage is provided to coordinate arm exercise with the foot pedals or for separate arm exercise only. A seat is provided adjustably supported by the framework to locate the operator in a generally recumbent position.

The pedals are guided through an oblong or elongate curve motion during operation by a seated operator in a recumbent position. The generally elliptical pedal curve is inclined towards the operator to maintain the leg force tangent to the curve during the down power stroke to improve energy transfer from the leg muscles to the pedal motion crank drive mechanism. Arm exercise is by arm levers coordinated with the mechanism guiding the foot pedals. An adjustment mechanism is provided to move a pivot or slider guide of the pedal mechanism to change the pedal motion during operation.

In the preferred embodiment, the apparatus includes a separate pedal for each foot, each pedal being attached to a crossarm member which is pivotally connected to a rotary crank and pivotally connected to a rocker arm. The rotary crank completes one full revolution during a pedal cycle and is phased generally opposite the crank for the other pedal through a bearing journal attached to the framework. The rocker arm is pivotally connected to the framework. The crank, crossarm and rocker form a four-bar linkage known in the literature as a crank-rocker mechanism. The elliptical pedal path is generated by a coupler point on the crossarm assembly. Arm exercise is provided with an extension of the rocker arm.

In another embodiment, the rocker arm of the four-bar linkage is replaced by a slider/roller guide which is pivotally attached to the crossarm to form a slider crank mechanism. The slider/roller guide is constrained to reciprocate in a linear or curved track adjustably secured to the framework. One end of the track is pivoted to the framework while the other end is pivotally attached to an actuator, which is pivotally attached to the frame. Activation of the actuator during operation of the exercise apparatus changes the orientation of the pedal path to exercise different muscles.

The pedals are attached to an adjustable pedal extension, which is attached to the crossarm where the length of the elliptical pedal path can be changed. The pedals do not rotate as an option for any of the embodiments herein.

Arm exercise is by handle levers attached to the crossarm members. The handle path is an oblong curve oriented with the major axis generally horizontal. Activation of the actuator changes the location of the handle curve and causes the orientation to more inclined.

In another embodiment, the rocker arm of the four-bar linkage, is replaced by a second crank having a second bearing housing attached to the framework. The second crank pin is connected to the crossarm member by a slide track attached to the crossarm member. The first and second cranks are coupled by chain or timing belts and equal diameter sprockets so that the cranks remain parallel during rotation. The bearing housing of one of the cranks is movably attached to the framework to change the pedal path.

Arm exercise is by handle levers adjustably attached to the crossarm members. A locking screw allows the handles to be rotated forward or backward as desired by the operator. The handle path is a bent oblong curve oriented with the minor axis generally vertical. Activation of the actuator changes the location of the handle curve and the orientation to more inclined.

In each embodiment, the framework supporting the pedal linkage systems is mobile because the rear axle is connected to wheels on either side of the mobile apparatus. A single front wheel is steered by a steering wheel with at least one hand while the other hand continues to exercise on an alternate basis. The substantial incline of the steering shaft allows the mobile apparatus to move in a straight path without frequent steering corrections. The crank is directly coupled to the axle by sprockets and chain. However, a speed changing transmission and differential can be added to couple the crank to the axle to improve the speed range and turning ability. Of course, two front wheels can also be used with one or two rear wheels.

In each embodiment, the crank can be coupled to the wheels by a transmission to drive at least one wheel of the mobile exercise apparatus. It should be understood that various forms of belts, gears, cable and shafting may be used to effect the transfer of rotary motion from the crank to the wheel. Steering is by steering wheel coupled to one of the wheels. Other forms of steering such as by levers and cables are also anticipated. Braking can be incorporated in the crank motion, by lever or hand grip and cables. It is understood that additional load resistance such as magnetic, alternator, fan, etc., can be coupled to a crank to provide variable intensity exercise.

While the operator is shown seated in the recumbent position in these embodiments, it must be understood that the operator can be seated in other positions and still enjoy the exercise benefits of the present position.

With each embodiment, flotation devices can be added to the vehicle frame to provide for an amphibious mobile exercise apparatus.

In summary, this invention provides the operator with coordinated mobile recumbent exercise of both the hands and feet through extended motions without joint impact.

DETAILED DESCRIPTION OF THE EMBODIMENTS

Figure 1:
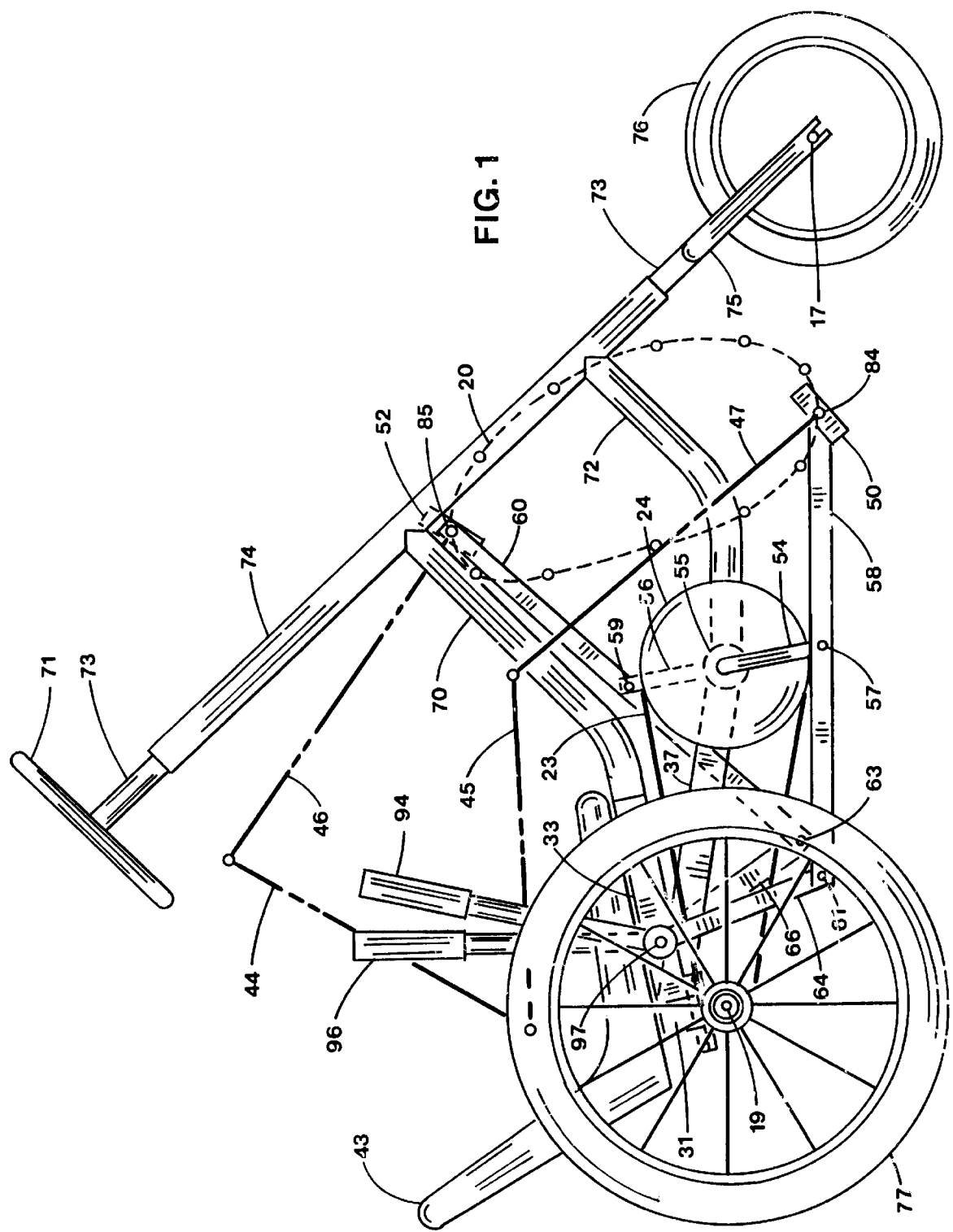
FIG. 1 is a right side elevation view of the preferred embodiment of an exercise machine constructed in accordance with the present invention.
Figure 2:
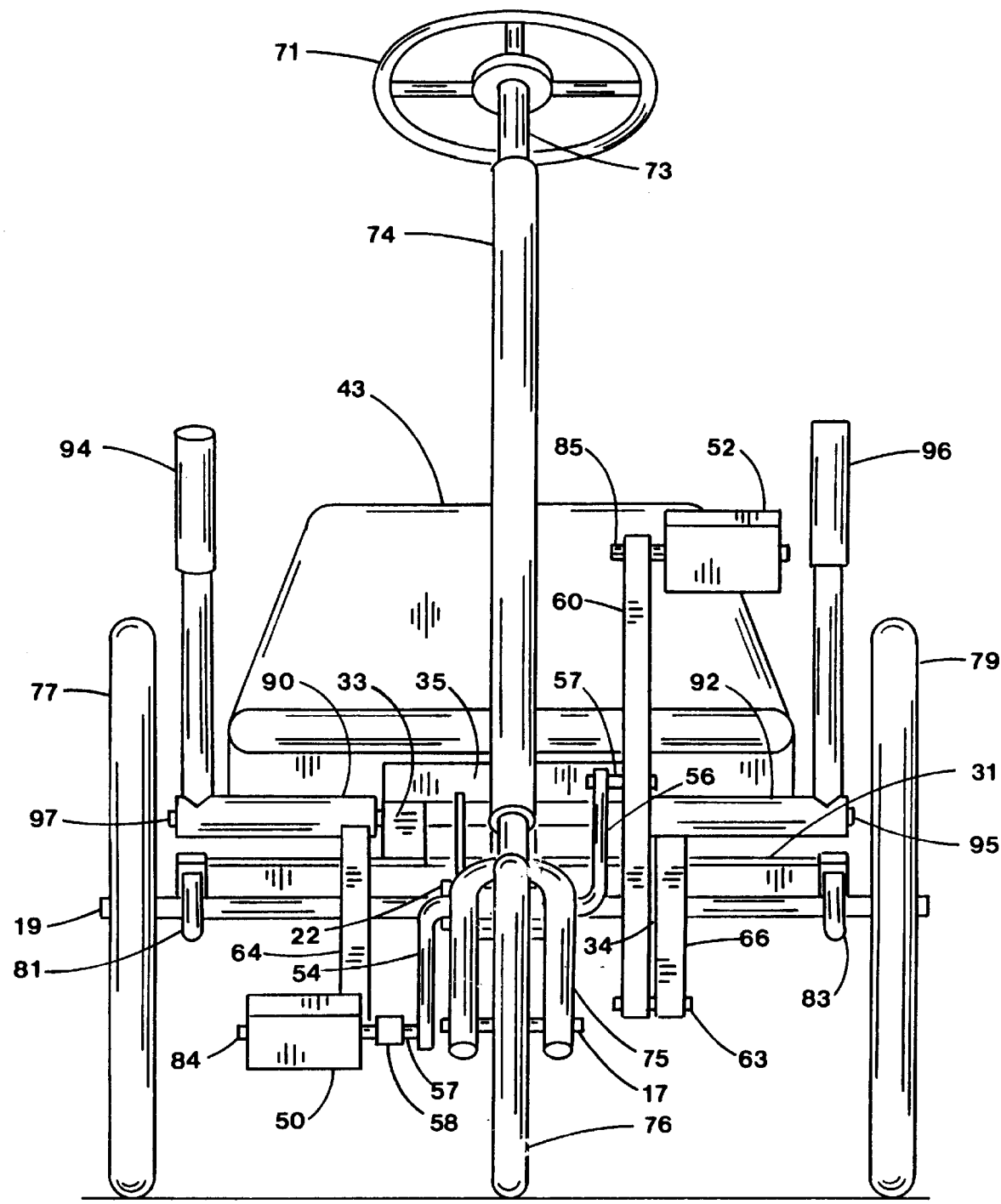
FIG. 2 is the front view of the preferred embodiment shown in FIG. 1.

Referring to the drawings in detail, pedals 50 and 52 are shown in FIGS. 1 and 2 in their uppermost and lowermost positions of the preferred embodiment. Pedals 50 and 52 are attached to crossarms 58 and 60. The crossarms 58 and 60 are supported by crank pins 57 and 59 and rocker pivots 61 and 63. Cranks 54 and 56 having crank pins 57 and 59, are connected in opposing directions by crankshaft journal (not shown) which is rotatably secured to frame supports 37 and 72 by bearing housing 55. Rocker arms 64 and 66 are connected to crossarms 58 and 60 at rocker pivots 61 and 63 and to frame members 33 and 34 by pivots 97 and 95.

Seat 43 is attached to members 33 and 34 that are connected by member 31 to frame member 37. Frame members 33 and 34 are connected to member 70 by member 35. The steering shaft housing 74 connects frame members 70 and 72. Steering wheel 71 is attached to shaft 73, which is rotatably housed by steering housing 74. The front wheel 76 is pivotally attached at 17 to fork 75, which is attached to shaft 73. Rear wheels 77 and 79 are supported by bearings 81 and 83, which are attached to frame member 31.

Arm exercise occurs with handles 94 and 96, which are connected to extensions 90 and 92 that pivot about shafts 97 and 95 secured to frame members 33 and 34. Extensions 90 and 92 are attached to rockers 64 and 66. A rearward force on arm handle 94 or 96 causes a forward force on rocker 64 or 66 in synchronous with the forward force of pedal 50 or 52.

Sprocket 24 is connected to crank 54 and coupled to sprocket 22 by chain 23. Wheels 77 and 79 are connected to sprocket 22 to drive the mobile apparatus. A speed change transmission and differential can also be used to rotatably couple the cranks 54, 56 to wheels 77, 79.

The power stroke is configured to maintain the lower legs 46 and 47 nearly tangent to the inclined elliptical pedal path curve 20 as the upper legs 44 and 45 apply downward force on pedals 50 and 52. The long power stroke provides greater leg exercise than a simple bike crank and applies more torque to the wheels to propel the mobile exercise apparatus.

Figure 3:
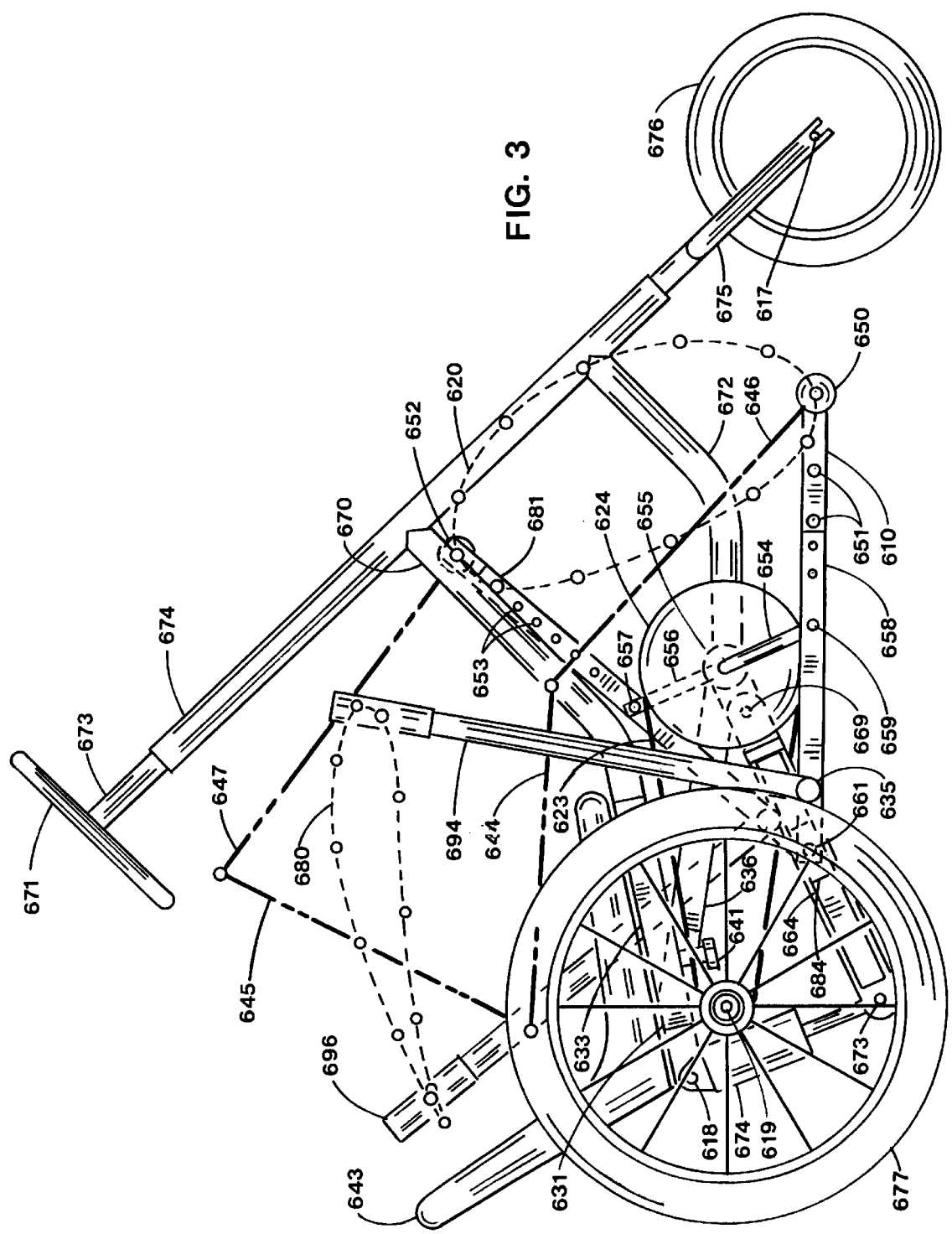
FIG. 3 is a right side elevation of the second embodiment of the present invention.
Figure 4:
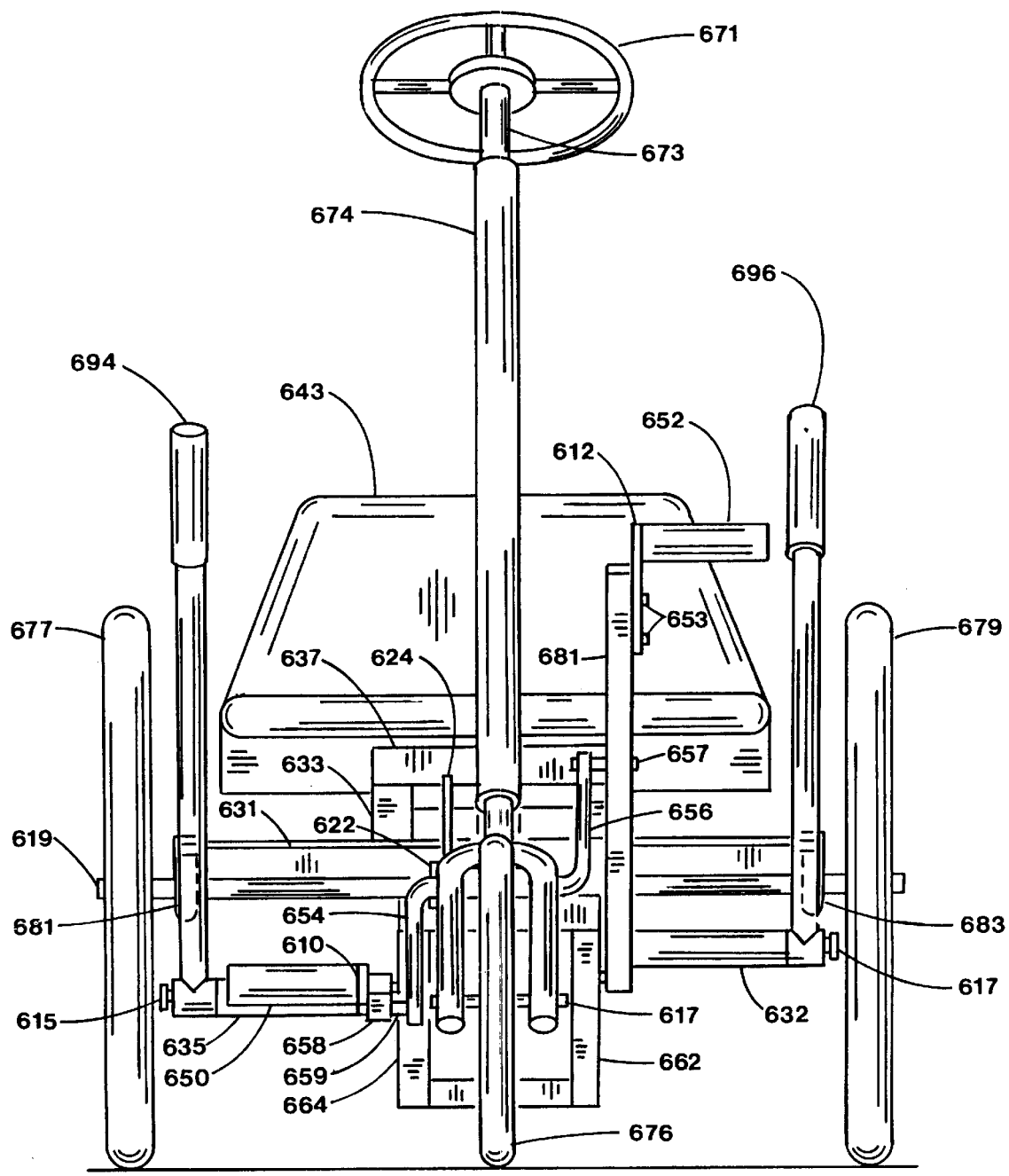
FIG. 4 is the front view of the second embodiment shown in FIG. 3.

Another embodiment of the present invention is shown in FIGS. 3 and 4 where pedals 650 and 652 are shown in their uppermost and lowermost positions of the second embodiment. Pedals 650 and 652 are attached to pedal extensions 610 and 612 which attach to crossarms 658 and 660 being secured to the crossarms 658 and 660 by locking screws 651 and 653. Extension of the pedals 650 and 652 allow a different pedal path curve 620. The crossarms 658 and 660 are supported by crank pins 657 and 659 and slider pivots 661 and 663.

Cranks 654 and 656 having crank pins 657 and 659, are connected in opposing directions by crankshaft journal (not shown) which is rotatably secured to frame supports 672 and 636 by bearing housing 655. Sliders 684 and 685 are connected to crossarms 658 and 660 by pivots 661 and 663 and constrained to reciprocate in tracks 664 and 666 which are attached to frame support 636 by pivot 669 on one end and attached to actuator 674 by pivot 673.

Actuator 674 is attached to frame support 631 by pivot 618. The actuator 674 can be activated to swing tracks 664 and 666 about pivot 669 to change the pedal path 620 during operation of the exercise apparatus. Double actuators can be used to give independent pedal adjustment for each foot path.

Seat 643 is adjustably attached to frame 633 with seat adjustment 641. Frame member 631 connects members 633 and 637. Member 637 connects members 633 and 670. Steering wheel 671 is attached to shaft 673, which is rotatably housed in shaft housing 674 and connected to fork 675. Front wheel 676 is rotatably attached to fork 675 by shaft 617. Rear wheels 677 and 679 are connected to axle 619, which is pivotally supported by bearings 681 and 683 that are attached to frame member 631. Sprocket 624 is attached to crank 654 and coupled to sprocket 622 by chain 623. Sprocket 622 is attached to axle 619. Of course, a transmission and differential can also rotatably couple wheels 677 and 679 to crank 654, 656.

Arm exercise occurs with handles 694 and 696 which are adjustably connected to arm extensions 635 and 632 by locking screws 615 and 617. Arm extensions 635 and 632 are attached to crossarms 658 and 660. The hands follow elongate curve 680 while the pedals 650 and 652 follow a generally inclined elliptical curve 620. A forward hand force on handle 694 acts with a down and forward force upon pedal 650 to rotate crank 654 while a rearward force on handle 696 acts to rotate crank 656 to lift pedal 652.

Application of upper leg 644 and 645, and lower leg 646 and 647 force acting upon pedals 650 and 652 move the pedals through elliptical path 620 to drive cranks 654 and 656 adding momentum to wheels 677 and 679. The pedals 650 and 652 and arm handles 694 and 696 can be operated together or independently to drive the wheels 677 and 679 in either direction of rotation.

Figure 5:
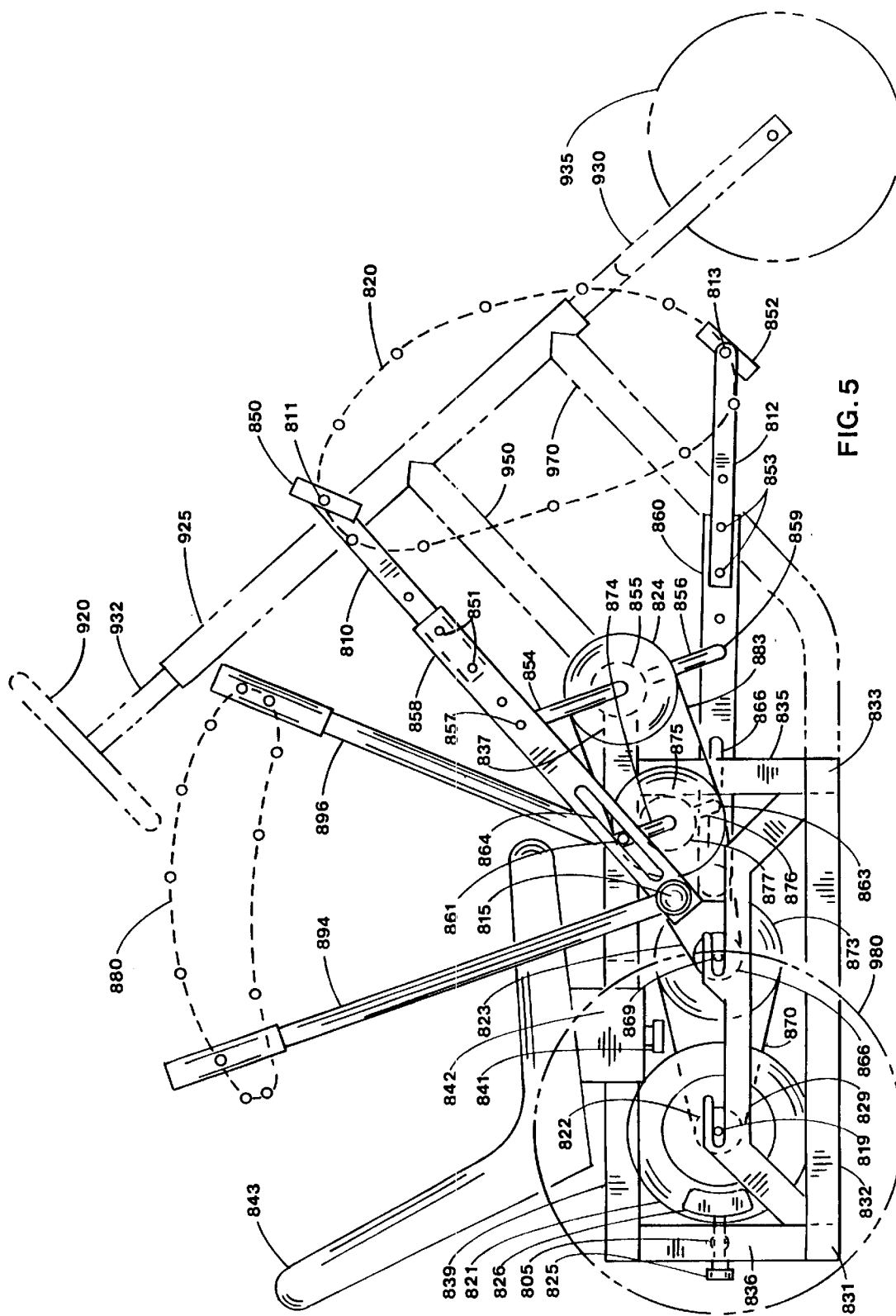
FIG. 5 is a right side elevation of the third embodiment of the present invention.
Figure 6:
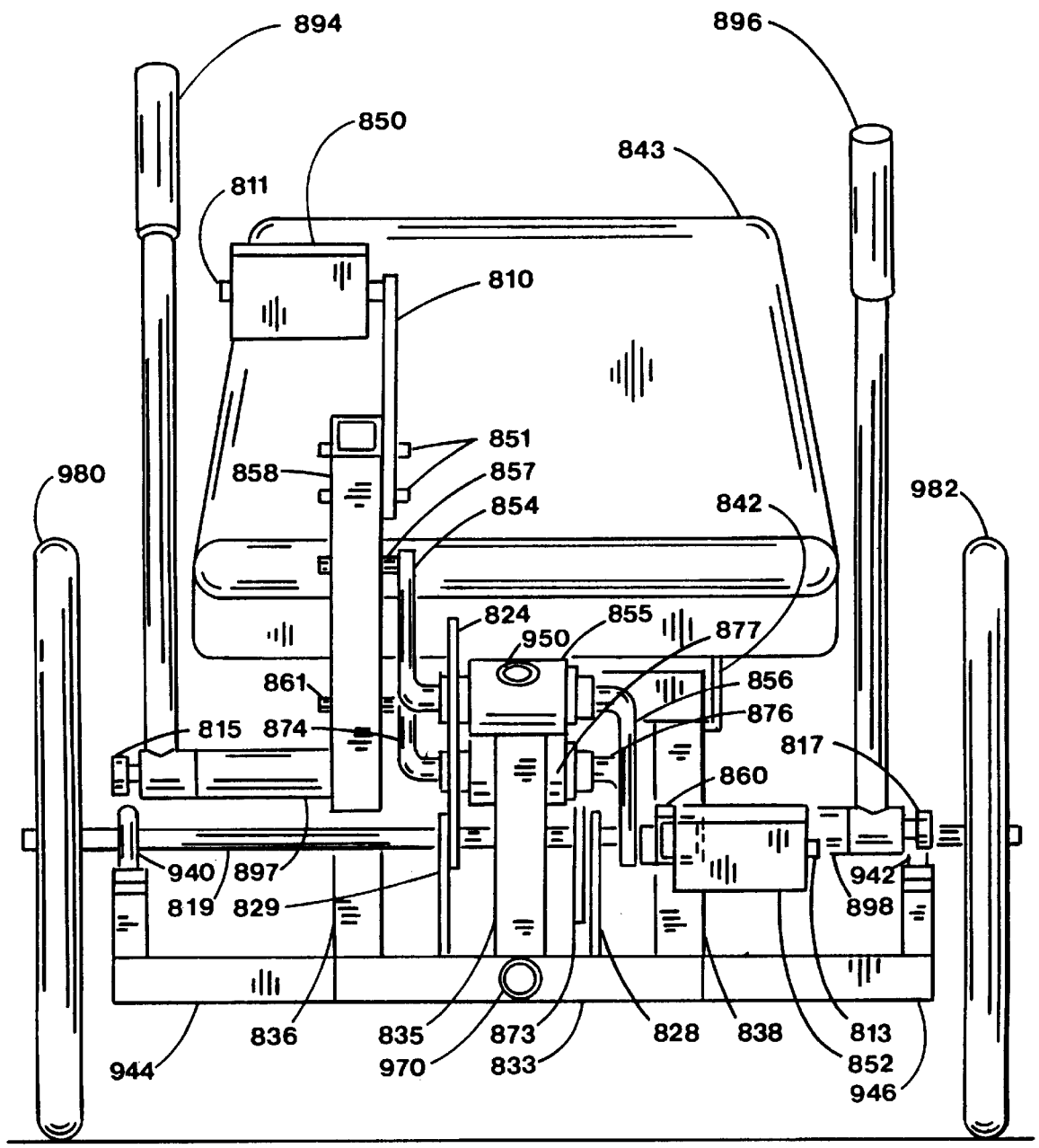
FIG. 6 is the front view of the third embodiment shown in FIG. 5 without the front steering assembly.

Another embodiment of the present invention is shown in FIGS. 5 and 6 where pedals 850 and 852 are shown in their uppermost and lowermost positions of the third embodiment. Pedals 850 and 852 are attached to pedal extensions 810 and 812 which attach to crossarms 858 and 860 being secured to the crossarms 858 and 860 by locking screws 851 and 853. Extensions of the pedals 850 and 852 allow a different pedal path curve 820.

The crossarms 858 and 860 are supported by crank pins 857 and 859 which are connected to a first pair of cranks 854 and 856, and crank pins 861 and 863 which are attached to a second pair of cranks 874 and 876 with slots 864 and 866. The first pair of cranks 854 and 856 are connected in opposing directions by a crankshaft journal (not shown) which is rotatably secured to frame support 837 by bearing housing 855. The second pair of cranks 874 and 876 are connected in opposing directions by a crankshaft journal (not shown) which is rotatably secured to frame support 835 by movable bearing housing 877.

Frame support members 832 and 834 are connected by cross members 831 and 833. Seat supports 839 and 840 are supported by upright supports 836, 838 and 835 which are attached to cross members 831 and 833. Seat 843 is attached to supports 839 and 840 by slide bracket 842 and locking screw 841.

Arm exercise occurs with handles 894 and 896 which are adjustably connected to arm extensions 897 and 898 by locking screws 815 and 817. Arm extensions 897 and 898 are attached to crossarms 858 and 860. The hands follow a bent oblong path 880 while the pedals 850 and 852 follow a generally elliptical curve 820. A forward hand force on handle 894 acts with a down and forward force upon pedal 850 to rotate crank 854 while a rearward force on handle 896 acts to rotate crank 856 to lift pedal 852.

Adjustable load resistance is provided by disc pads 826 and 827 acting upon flywheel 821 by adjustment mechanism 805 and handle 825 which is rotatably attached to support 836. Flywheel 821 is rotatably attached to supports 828 and 829 by axle shaft 819. Sprocket 822 is attached to flywheel 821 and coupled to sprocket 873 by chain 870. Sprocket 873 is attached to rotate with sprocket 866 about jackshaft 869 which is attached to supports 829 and 828. Sprocket 866 is coupled to sprocket 875 which is attached to crank 874 and to sprocket 824 which is attached to crank 854 whereby the cranks rotate with parallel motion.

Application of upper leg and lower leg force through the feet acting upon pedals 850 and 852 move the pedals through elliptical path 820 to drive cranks 854 and 856 adding momentum to flywheel 821. This flywheel 821 momentum will carry the linkage system through any dead center positions of cranks 854 and 856. The pedals 850 and 852 and arm handles 894 and 896 can be operated together or independently to drive flywheel 821 in either direction of rotation.

Adaptation of the elliptical pedal foot motion and/or elongated closed loop arm motion to a land vehicle is shown in FIGS. 5 and 6 with rear wheels 980 and 982 supported by axle 819 which is attached to sprocket 822. Axle 819 is supported by bearing 940 and 942 that are attached to frame extensions 944 and 946. Front wheel 935 supported by fork 930 that is attached to one end of steering shaft 932 with the steering wheel 920 connected to the other end. Steering housing 925 is rotatably attached to steering shaft 932 and supported by frame members 950 and 970.

Frame member 950 is attached to bearing housing 855 and frame member 970 is attached to frame member 833. Handles 894 and 896 are optional during vehicle movement. For an amphibious vehicle, the rear wheels would also function as paddle wheels and the front wheel as a rudder with a hull attached to frame members 832 and 834.

What is claimed is:

1. A mobile exercise apparatus comprising:
   a framework means, said framework means configured to be supported by at least two wheels and support a seat means;
   a pedal means, said pedal means configured for each foot of a seated operator;
   a linkage means having first and second ends and having a crank means connected intermediate said ends and projecting outwardly therefrom on both sides thereof, said crank means rotatably connected to said framework means;
   a coupling means operably associated with said linkage means at said first end and said framework means;
   means for rotatably engaging said crank means with at least one of said wheels;
   said pedal means connected to each said linkage means at a second end of said linkage means whereby said pedal means follows a generally elliptical inclined pedal path as said crank means rotates with the foot force acting upon said pedal means to initiate rotation of at least one of said wheels.

2. The mobile exercise apparatus according to claim 1 wherein said coupling means is a rocker arm means pivotally connected to said linkage means on one end and pivotally connected to said framework means on the other end.

3. The mobile exercise apparatus according to claim 1 wherein said coupling means is a reciprocation means pivotally connected to said linkage means and contrained to move with reciprocating motion by a track means connected to said framework means.

4. The mobile exercise apparatus according to claim 1 wherein said coupling means is a second crank means pivotally connected to said linkage means on one end and rotatably associated with said framework means on the other end, said second crank means being operably associated with said first crank means by a belt and equal diameter sprockets.

5. The mobile exercise apparatus according to claim 1 further comprising an actuator means connected to said coupling means on one end and operably associated with the framework on the other whereby said coupling means connection to said framework means can be moved during operation of said mobile exercise apparatus thereby causing said oblong inclined pedal path to change.

6. The mobile exercise apparatus according to claim 1 further comprising a pedal adjustment means wherein said pedal means is connected to said linkage means with a locking means whereby said locking means can be released to reposition the pedal means relative to said linkage means thereby causing said oblong inclined pedal path to change.

7. The mobile exercise apparatus according to claim 1 further comprising an adjustment means whereby said seat means can be moved relative to said framework means.

8. The mobile exercise apparatus according to claim 1 further comprising arm exercise means operably associated with said linkage means.

9. The mobile exercise apparatus according to claim 1 wherein said pedal means for each foot becomes a handle means for each hand.

10. A mobile exercise apparatus comprising:
    a framework means, said framework means configured to be supported by at least two wheels and support a seat means;
    a pedal means, said pedal means configured for each foot of a seated operator;
    a linkage means having a crank means projecting outwardly therefrom on both sides thereof, said crank means rotatably connected to said framework means;
    a coupling means operably associated with said linkage means and said framework means;
    means for rotatably engaging said crank means with at least one of said wheels;
    said pedal means connected to each said linkage means whereby said pedal means follows a generally elliptical pedal path as said crank means rotates with the foot force acting upon said pedal means of an operator positioned in said seat means, said foot force acting generally tangent to the uppermost portion of said elliptical path to initiate rotation of at least one of said wheels.

11. The mobile exercise apparatus according to claim 10 wherein said coupling means is a rocker arm means pivotally connected to said linkage means on one end and pivotally connected to said framework means on the other end.

12. The mobile exercise apparatus according to claim 10 wherein said coupling means is a roller means pivotally connected to said linkage means and contrained to move with reciprocating motion by a track means connected to said framework means.

13. The mobile exercise apparatus according to claim 10 wherein said coupling means is a second crank means pivotally connected to said linkage means on one end and rotatably associated with said framework means on the other end, said second crank means being operably associated with said first crank means.

14. The mobile exercise apparatus according to claim 10 further comprising an actuator means connected to said coupling means on one end and operably associated with the framework on the other whereby said coupling means connection to said framework means can be moved during operation of said exercise machine thereby causing said elliptical inclined pedal path to change.

15. The mobile exercise apparatus according to claim 10 further comprising a pedal adjustment means wherein said pedal adjustment means can be released to reposition the pedal means relative to said linkage means thereby causing said elliptical inclined pedal path to change.

16. The mobile exercise apparatus according to claim 10 further comprising arm exercise means operably associated with said linkage means.

17. The mobile exercise apparatus according to claim 10 further comprising arm exercise means wherein said arm exercise means comprises a handle means operably associated with said coupling means.

18. The mobile exercise apparatus according to claim 10 further comprising a load resistance means operably associated with said crank means to increase exercise intensity during operation of said mobile exercise apparatus.

19. The mobile exercise apparatus according to claim 10 further comprising an adjustable transmission means operably associated with said crank means and said wheel coupled to said crank means whereby the speed of said mobile exercise apparatus can be regulated.

20. The mobile exercise apparatus according to claim 10 further comprising another wheel operably associated with said driven wheel.

21. The mobile exercise apparatus according to claim 10 further comprising a steering means connected to said framework means and operably controlling at least one of said wheels.

22. The mobile exercise apparatus according to claim 21 wherein said steering means positions said wheel with a turning axis that is substantially inclined.

* * * * *